United States Patent
Peterson et al.

(10) Patent No.: US 7,382,833 B1
(45) Date of Patent: Jun. 3, 2008

(54) SYSTEM FOR PHASE, GAIN, AND DC OFFSET ERROR CORRECTION FOR A QUADRATURE MODULATOR

(75) Inventors: Maurice W. Peterson, Swisher, IA (US); Richard A. Groshong, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 741 days.

(21) Appl. No.: 09/931,493

(22) Filed: Aug. 16, 2001

(51) Int. Cl.
H04K 1/02 (2006.01)
(52) U.S. Cl. .................... 375/296; 375/285
(58) Field of Classification Search ............... 375/296, 375/346, 295, 278, 285, 297, 284, 298, 327; 327/306
See application file for complete search history.

(56) References Cited

U.S. PATENT DOCUMENTS

| | | | | |
|---|---|---|---|---|
| 3,845,390 A | * | 10/1974 | De Jager et al. | 375/231 |
| 5,012,208 A | * | 4/1991 | Makinen et al. | 332/103 |
| 5,023,937 A | * | 6/1991 | Opas | 455/126 |
| 5,249,204 A | * | 9/1993 | Funderburk et al. | 375/344 |
| 5,321,726 A | * | 6/1994 | Kafadar | 375/323 |
| 5,506,546 A | * | 4/1996 | Kowaguchi | 332/103 |
| 5,507,014 A | * | 4/1996 | Wray et al. | 455/114.3 |
| 5,675,287 A | * | 10/1997 | Baker et al. | 330/129 |
| 5,705,958 A | * | 1/1998 | Janer | 332/103 |
| 5,732,333 A | * | 3/1998 | Cox et al. | 455/126 |
| 5,745,006 A | * | 4/1998 | Budnik et al. | 330/149 |
| 5,937,011 A | * | 8/1999 | Carney et al. | 375/297 |
| 6,141,377 A | * | 10/2000 | Sharper et al. | 375/222 |
| 6,141,390 A | * | 10/2000 | Cova | 375/297 |
| 6,211,733 B1 | * | 4/2001 | Gentzler | 330/149 |
| 6,232,835 B1 | * | 5/2001 | Braithwaite | 330/149 |
| 6,252,912 B1 | * | 6/2001 | Salinger | 375/278 |
| 6,266,517 B1 | * | 7/2001 | Fitzpatrick et al. | 455/114.3 |
| 6,275,685 B1 | * | 8/2001 | Wessel et al. | 455/126 |
| 6,288,610 B1 | * | 9/2001 | Miyashita | 330/149 |
| 6,313,703 B1 | * | 11/2001 | Wright et al. | 330/149 |
| 6,314,142 B1 | * | 11/2001 | Perthold et al. | 375/296 |
| 6,373,902 B1 | * | 4/2002 | Park et al. | 375/296 |
| 6,591,090 B1 | * | 7/2003 | Vuorio et al. | 455/126 |
| 6,654,426 B2 | * | 11/2003 | Lagerblom et al. | 375/296 |
| 6,674,808 B1 | * | 1/2004 | Griph et al. | 375/285 |
| 6,711,217 B1 | * | 3/2004 | Jeong | 375/297 |
| 6,720,839 B1 | * | 4/2004 | Torre et al. | 332/103 |
| 6,741,662 B1 | * | 5/2004 | Francos et al. | 375/297 |
| 6,756,845 B1 | * | 6/2004 | Mashhour | 330/149 |
| 7,062,233 B2 | * | 6/2006 | Huttunen | 455/114.3 |
| 2001/0014592 A1 | * | 8/2001 | Helms | 455/91 |
| 2002/0016154 A1 | * | 2/2002 | Huttunen | 455/63 |
| 2002/0034260 A1 | * | 3/2002 | Kim | 375/296 |

* cited by examiner

*Primary Examiner*—Emmanuel Bayard
(74) *Attorney, Agent, or Firm*—Nathan O. Jensen; Kyle Eppele

(57) ABSTRACT

A quadrature modulator compensation system for compensating the transmission of a source signal includes a transmitter which uses a transmitter input signal to generate a transmitter output. Calibration circuitry generates at least one of a phase error estimate of the transmitter, a gain error estimate of the transmitter, and a dc offset estimate. Predistortion circuitry receives the estimates and the source signal as inputs and provides the transmitter input signal as a function of the estimates.

19 Claims, 7 Drawing Sheets

SYSTEM FOR PHASE, GAIN, AND DC OFFSET ERROR CORRECTION FOR A QUADRATURE MODULATOR

FIELD OF THE INVENTION

The present invention relates to radio communications technology. More particularly, the present invention relates to quadrature modulators and quadrature signal processing circuits and systems.

BACKGROUND OF THE INVENTION

Quadrature modulators operate on separate in-phase (I or i) and quadrature (Q or q) data corresponding to a single transmit or receive signal. Modern transmitters, such as direct conversion radio transmitters and quadrature modulators, are driven by digital circuits at very high sampling rates. Even though the in-phase and quadrature data is created digitally in perfect quadrature from the same signal, it is distorted by the analog circuits during transmission due to phase, gain and direct current (dc or DC) errors inherent in such analog circuits. As a result, compensation for these errors must be substantially continuous due to circuit variations over time, temperature and ever widening bandwidths. Therefore, an improved method of compensating for phase, gain and dc errors associated with the analog circuits of analog transmitters would be a significant improvement in the art.

SUMMARY OF THE INVENTION

A quadrature modulator compensation system for compensating the transmission of a source signal includes a transmitter which uses a transmitter input signal to generate a transmitter output. Calibration circuitry generates a phase error estimate of the transmitter as a function of an angle of intersection between an ideal transmitter envelope and an actual transmitter envelope. The calibration circuitry also generates a gain error estimate of the transmitter as a function of variation in the actual transmitter envelope, as determined by semi-major and semi-minor axes of an elliptical transmitter waveform. Further, the calibration circuitry determines a centroid of the actual transmitter envelope, and estimates dc offsets in an in-phase component and a quadrature component of the source signal as a function of the centroid of the actual transmitter envelope. Predistortion circuitry receives the phase, gain, and dc offset error estimates and the source signal as inputs and provides the transmitter input signal as a function of the phase, gain, and dc offset error estimates.

BRIEF DESCRIPTION OF THE DRAWINGS

FIG. 1 is a block diagram of a quadrature modulator compensation system incorporating concepts of the present invention.

DETAILED DESCRIPTION OF AN ILLUSTRATIVE EMBODIMENT

Figure 2:
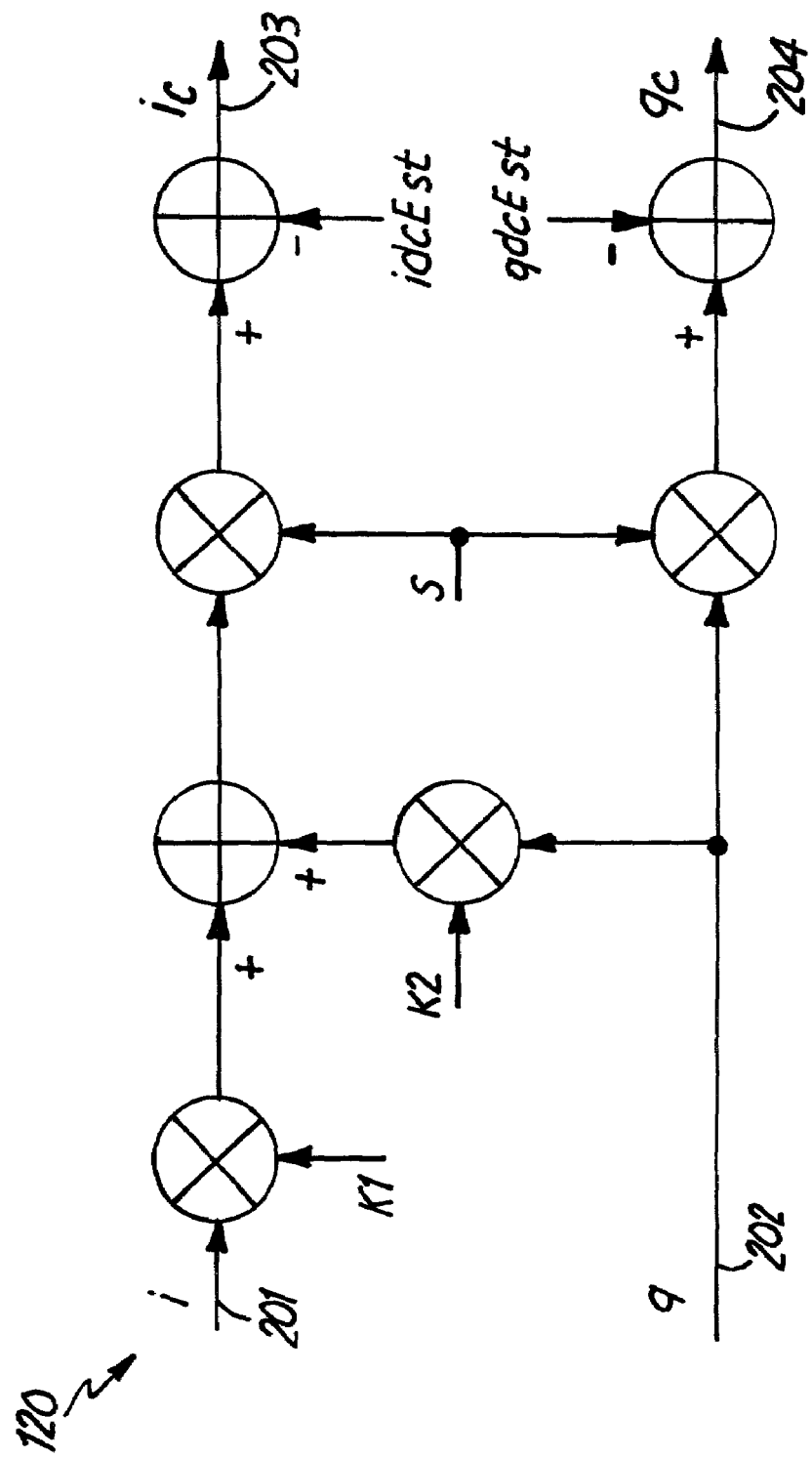
FIG. 2 is a circuit diagram illustrating one embodiment of the predistortion or correction circuitry shown in the system of FIG. 1.

The present invention includes a method to compute the phase, gain, and dc error estimates associated with the analog circuits of quadrature transmitters. The present invention includes, and is described with reference to, an apparatus configured to implement algorithms that detect and compensate for these phase, gain, and dc offset error estimates.

Figure 1:
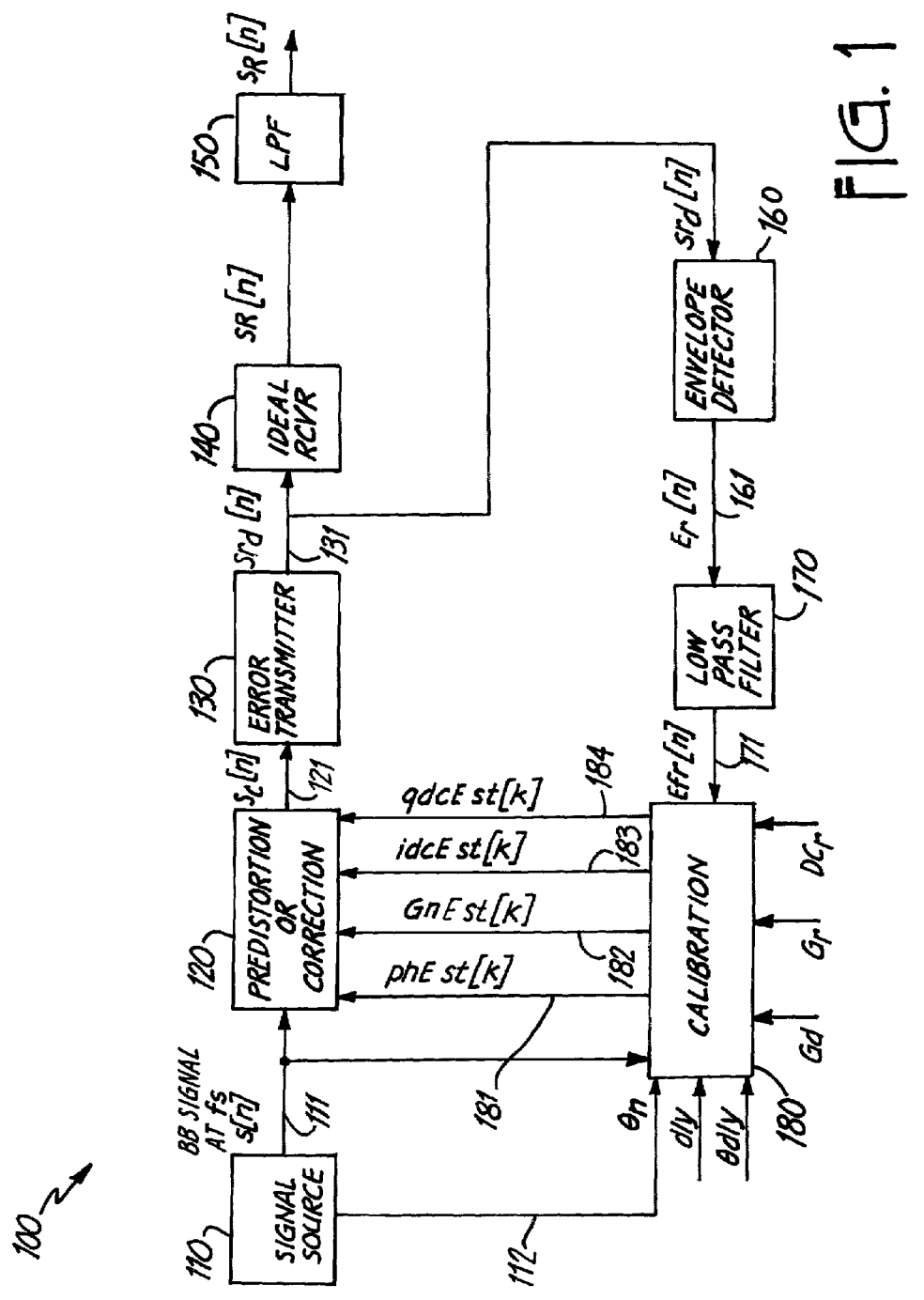

A general system or block diagram is provided in FIG. 1 in order to illustrate the methods of the invention. Complex signals are assumed at the output of each functional block shown in FIG. 1, unless otherwise noted in the discussion that follows. System 100 includes signal source 110, predistortion or correction circuitry 120, error transmitter 130, ideal receiver 140, low pass filter 150, envelope detector 160, low pass filter 170, and calibration circuitry 180. Each of these functions or functional blocks can be implemented in circuitry or in one or more suitably programmed processors, application specific integrated circuits (ASICs), or other circuitry. Also, more than one of these functions can be implemented in the same processor or other circuitry. References to processors or circuitry being adapted to implement these functions means that the processors or circuitry are programmed or configured to implant the functions.

Signal source 110 is the data generator that provides data to drive the simulation for the following description which explains the methods of the present invention. In the system 100, signal source 110 provides the signal 111 to be transmitted by transmitter 130 after predistortion or correction by circuitry 120. Predistortion circuitry or function 120 changes the source data in such a way as to compensate for transmitter errors before transmission occurs. Error transmitter 130 adds errors to the signal provided by predistortion or correction circuitry 120 and translates it to the radio, or channel, frequency (rf) for transmission. Envelope detector 160 provides feedback about the transmitter's envelope to calibration circuitry or function 180 via low pass filter 170 which attenuates double channel and harmonic frequencies. The calibration algorithms or methods of the present invention implemented by calibration circuitry 180 compute correction coefficients and values which drive a correction model. Ideal receiver 140 and its associated low pass filter 150 are included for visual performance results and analysis. Detailed explanations of the functions performed by each of these blocks are provided as follows.

Signal source 110 illustrated in FIG. 1 is typically an integrated circuit (IC) microprocessor optimized for digital signal processing (DSP). Signal source 110 can also be a digital IC such as an ASIC. The complex output s[n] (designated by reference number 111) of source 110 must be predistorted by the second function in FIG. 1 (circuitry 120) in an appropriate way before application to error transmitter or transmitter function 130. Signal source 110 also provides at output 112 its phase $\theta_n$ to the calibration circuitry or function 180, which is discussed later in greater detail. For the purposes of discussion, signal s[n] can be described as a complex sinusoid, where ω is the modulation frequency, n is the sample number, and Ts is the sampling period, using the relationship shown in Equation 1:

$$s_n = \cos(\omega \cdot n \cdot Ts) + j \cdot \sin(\omega \cdot n \cdot Ts) \qquad \text{Equation 1}$$

The purpose of the predistortion function implemented in block 120 is to correct for phase, gain, and dc offset errors inherent in transmitter 130. FIG. 2 is a circuit diagram illustrating the predistortion or correction function applied to input signal s[n] by circuitry 120 in embodiments of the present invention. As can be seen in FIG. 1, in one embodiment, calibration circuitry 180 provides to predistortion circuitry 120 the coefficients or values phEst[k] 181, GnEst[k] 182, idcEst[k] 183 and qdcEst[k] 184. Coefficients phEst[k] and GnEst[k] are estimates of the phase error and the gain error, respectively, between the i and q quadrature components 201 and 202 (FIG. 2) of the input signal s[n] 111. Coefficients idcEst[k] and qdcEst[k] are respectively estimates of the dc offset in the i and q components of input signal s[n]. The coefficients provide an approximation of the inverse error function of transmitter 130. That is, given that the ideal transmitter function output as a function of its input is represented by Ti (where Ti=T*input), and given that the error in a practical transmitter is represented by E, then the predistortion function 120 approximates $E^{-1}$ in the limit as time goes to infinity. Oversimplifying for the moment, from the above assuming that the practical (or error) transmitter output is given by Tp (where Tp=T*E*input), and assuming that the predistortion function output 121 is given by $s_c[n]$ (where $s_c[n]=E^{-1}*s[n]$), then the error transmitter output $sr_d[n]$ (designated by reference number 131 in FIG. 1) is given by Equation 2:

$$sr_d[n] = T*E*E^{-1}*s[n] = T*s[n] \qquad \text{Equation 2}$$

This is the desired result after the appropriate substitutions from FIG. 1 have been made, assuming perfect correction.

Figure 3:
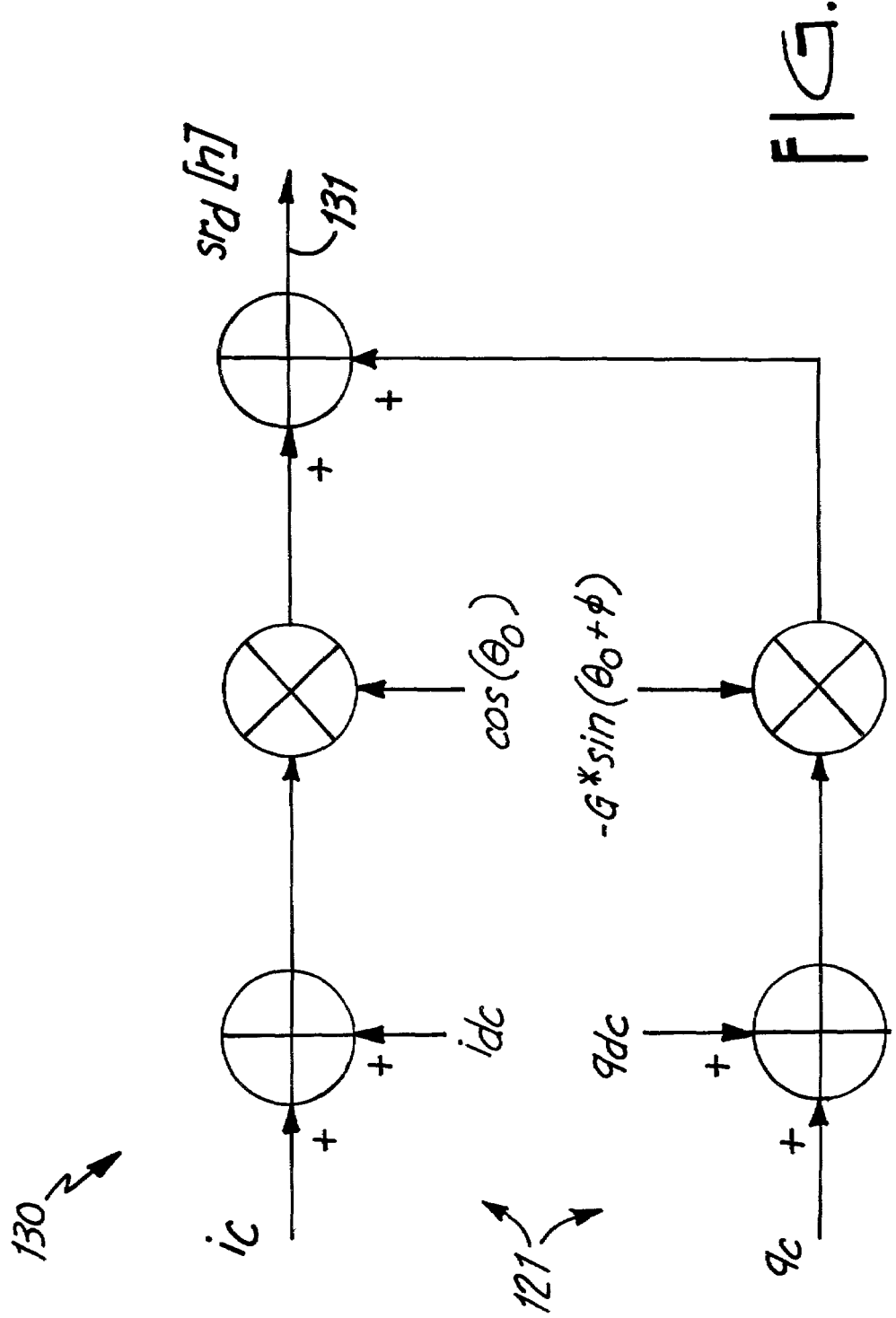
FIG. 3 is a circuit diagram illustrating one embodiment of the error transmitter shown in the system of FIG. 1.

FIG. 2 illustrates the model assumed in predistortion circuitry 120 for the inverse error function, $E^{-1}$, of error transmitter 130 described above. This model results from assuming that the phase and gain errors are modeled in the quadrature leg of the transmitter as shown in FIG. 3. The inputs i,q (201,202) and outputs $i_c, q_c$ (203,204) represent quadrature components of input signal s[n] and output signal $s_c[n]$, respectively, in FIG. 1. K1 is a gain error term given by Equation 3:

$$K1_k = GnEst_k \cdot \cos(phEst_k) \qquad \text{Equation 3}$$

K2 is a crossover term involved in phase error given by Equation 4:

$$K2_k = GnEst_k \cdot \sin(phEst_k) \qquad \text{Equation 4}$$

S is a gain correction term to maintain unity gain given by Equation 5:

$$S_k = (GnEst_k \cdot \cos(phEst_k))^{-1} \qquad \text{Equation 5}$$

Assuming that $s_{c_n} = i_{c_n} + j \cdot q_{c_n}$ and assuming the above expressions for coefficients K1, K2, and S in FIG. 2, the output 203,204 ($S_c[n]$ 121 in FIG. 1) is determined using the relationship of Equation 6:

$$s_{c_n} = S \cdot (K1 \cdot i_n + K2 \cdot q_n) - idcEst_k + j \cdot (S \cdot q_n - qdcEst_k) \qquad \text{Equation 6}$$

The estimates of the offset errors idcEst and qdcEst are independent of the phase and gain errors and are computed as the centroid of the received envelope (from envelope detector 160). As will be described below in greater detail, the envelope of error transmitter 130 is resolved to the signal source's phase with delay compensation in order to approximate the errors as shown here.

Error transmitter 130 implements an error transmitter function which can be modeled mathematically as shown in FIG. 3. This function translates the baseband signal $sr_d[n]$ (i.e., component signals $i_c$ and $q_c$) at output 131 to a local oscillator (LO), or channel, frequency θo. The transmitter or transmitter function may be complex, but the real model is used in forming the real output 131, $sr_d[n]$, shown in FIG. 1. This model assumes all phase & gain errors are in the quadrature channel. That is, the in-phase channel i is used as the reference channel. All of the models discussed here are inter-related using this assumption. However, in view of this disclosure, new models can be derived in order to model the phase and gain errors in the in-phase channel. The output $sr_d[n]$ 131 of error transmitter 130 illustrated in FIGS. 1 and 3 can be expressed using the relationship shown in Equation 7:

$$sr_d[n] = (i_{c_n} + i_{dc}) \cos(\theta_{O_n}) - G(q_{c_n} + q_{dc}) \sin(\theta_{O_n} + \phi) \qquad \text{Equation 7}$$

where $i_{dc}$ and $q_{dc}$ represent the actual in-phase and quadrature dc offset errors, G represents the actual gain error, and φ represents the actual phase error inherent in the transmitter (these are the errors to be estimated by calibration circuitry 180).

Envelope detector 160 in FIG. 1 is applied to the error transmitter output, $sr_d[n]$, to provide feedback about the transmitter output 131 to a calibration function or circuitry 180. The value $G_d$ provided to calibration circuitry 180 is a gain term to compensate for using a real signal as opposed to a complex signal. The gain & dc errors, $G_r$ and $DC_r$, respectively, inherent in envelope detector 160 are factored into its real output, Er[n] 161, which is filtered by low pass filter 170 to remove any double frequency and harmonic terms before use by the Calibration function as Efr[n] 171.

Figure 4:
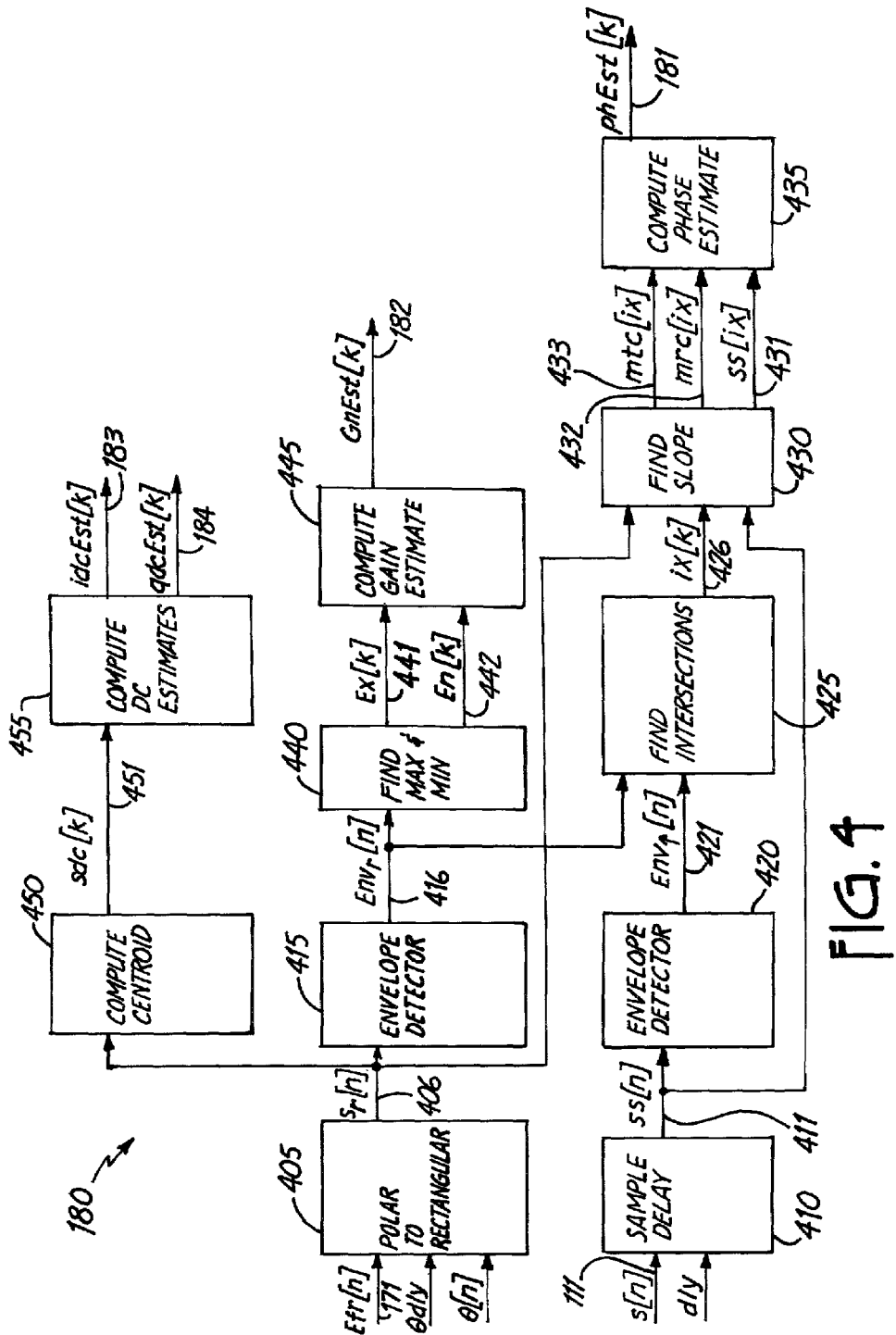
FIG. 4 is a block diagram illustrating one embodiment of the calibration circuitry shown in the system of FIG. 1.

The calibration circuitry function 180 shown in FIG. 1 is also shown separately in FIG. 4. This circuitry resolves the filtered envelope detector output, Efr[n] 171, into a quadrature signal, compensates for circuit and filter delays, and computes updated estimates of the phase (phEst[k]), gain (GnEst[k]), and dc offset (idcEst[k] & qdcEst[k]) errors at a decimated rate. The phase error detection and correction algorithm implemented by circuitry 180 computes the angle of intersection of the envelope of the transmitter output and the ideal transmitter envelope which is then integrated to form a phase error estimate. The gain error detection and correction algorithm implemented by circuitry 180 computes the maximum envelope variation of the transmitter output which is then integrated to form a gain error estimate. The dc offset error detection and correction algorithm implemented by circuitry 180 computes the centroid of the envelope of the transmitter output which is then integrated to form a dc offset error estimate for both the i and q channels. The calibration circuitry or function 180 implements several simple functions and a discussion of these individual components is provided below with reference to FIG. 4. FIG. 4 shows a functional decomposition of circuitry 180 and is the top level diagram for purposes of discussion.

FIG. 4 illustrates various functions implemented by calibration circuitry 180 in accordance with aspects of the present invention. The various functional blocks illustrated in FIG. 4 can be implemented within one or more processors in accordance with the following discussion. However, in other embodiments, each functional block is implemented using separate circuitry. While all such embodiments are considered to be within the scope of the present invention, the following discussion refers to the separate functions illustrated in FIG. 4 as being separate circuitry.

As can be seen in FIG. 4, calibration circuitry 180 includes polar to rectangular converter 405. This circuitry or function uses the phase θ[n] from signal source 110 and a constant phase delay θdly to resolve the filtered envelope Efr[n] into quadrature components needed by the other calibration function elements. The phase delay θdly represents hardware delay and can be retrieved from a table of values stored in memory which are accessed by circuit 405. The result, $s_r[n]$ provided by polar to rectangular converter 405 at output 406 includes projection of the filtered envelope phasor onto the real and imaginary axes. A mathematical model for this process is shown in Equation 8:

$$s_{r_n} = Efr_n \cdot \cos(\theta_n + \theta dly) + j \cdot Efr_n \cdot \sin(\theta_n + \theta dly) \quad \text{Equation 8}$$

Sample delay circuitry 410 receives signal s[n] from signal source 110, as well as delay, dly, to compensate for pure time (i.e., sample) delay when needed. Dly is a pure time delay representing the time compensation required to allow the association of the proper samples when computing coordinates of intersection. It is an artifact of hardware and filtering delays from the signal source to the calibration function that can be determined off-line and stored in a table or constant. The output ss[n] 411 can be defined for example using the relationship shown in Equation 9.

$$ss_n = s_{n-dly} \quad \text{Equation 9}$$

Envelope detector 415 is used to detect the quadrature signal $S_r[n]$ 406 formed during the resolution of the filtered envelope Efr[n] 171 to the source's phase and compensation for delay. This function may not be needed depending on sampling resolution, timing and phase delays. The real and imaginary operators are a modeling convenience. Any implementation will normally use rectangular coordinates. The envelope output 416, $Env_r[n]$, of envelope detector 415 is given by:

$$Env_{r_n} = \sqrt{(Re(S_{r_n}))^2 + (Im(s_{r_n}))^2} \quad \text{Equation 10}$$

where, $Re(S_{rn})$ is the real portion of $S_r[n]$; and
$Im(S_{rn})$ is the imaginary portion of $S_r[n]$.

Envelope detector 420 is used to compute the envelope of source signal S[n] 111, including any necessary sample delay θdly, which will be used as the desired or reference waveform. The mathematical model can be the same as shown in Equation 10, with the appropriate substitutions made at the input and output (ss[n] for $S_r[n]$, and $Env_t[n]$ for $Env_r[n]$ respectively).

Intersection identifying circuitry 425 finds the points of intersection of the received and filtered transmitter envelope, $Env_r[n]$ 416, with the desired waveform, $Env_t[n]$ 421. Index of intersections ix(ix[k] in FIG. 4) can be calculated as shown in Equation 11 below. The u( ) function in Equation 11 is the unit step function used to detect when the envelope error variable, $Env_e[n]$, changes sign. The envelope error variable $Env_e[n]$ is defined in Equation 12. The input to u( ) is always positive except when there is a sample on each side of an intersection, in which case it is negative. Whenever the error changes sign, an intersection is indicated, and the index of that intersection, n, is saved in ix 426.

$$ix = -n \cdot (u(Env_{e_n} - Env_{e_{n-1}}) - 1) \quad \text{Equation 11}$$

$$Env_{e_n} = Env_{r_n} - Env_{t_n} \quad \text{Equation 12}$$

Figure 5:
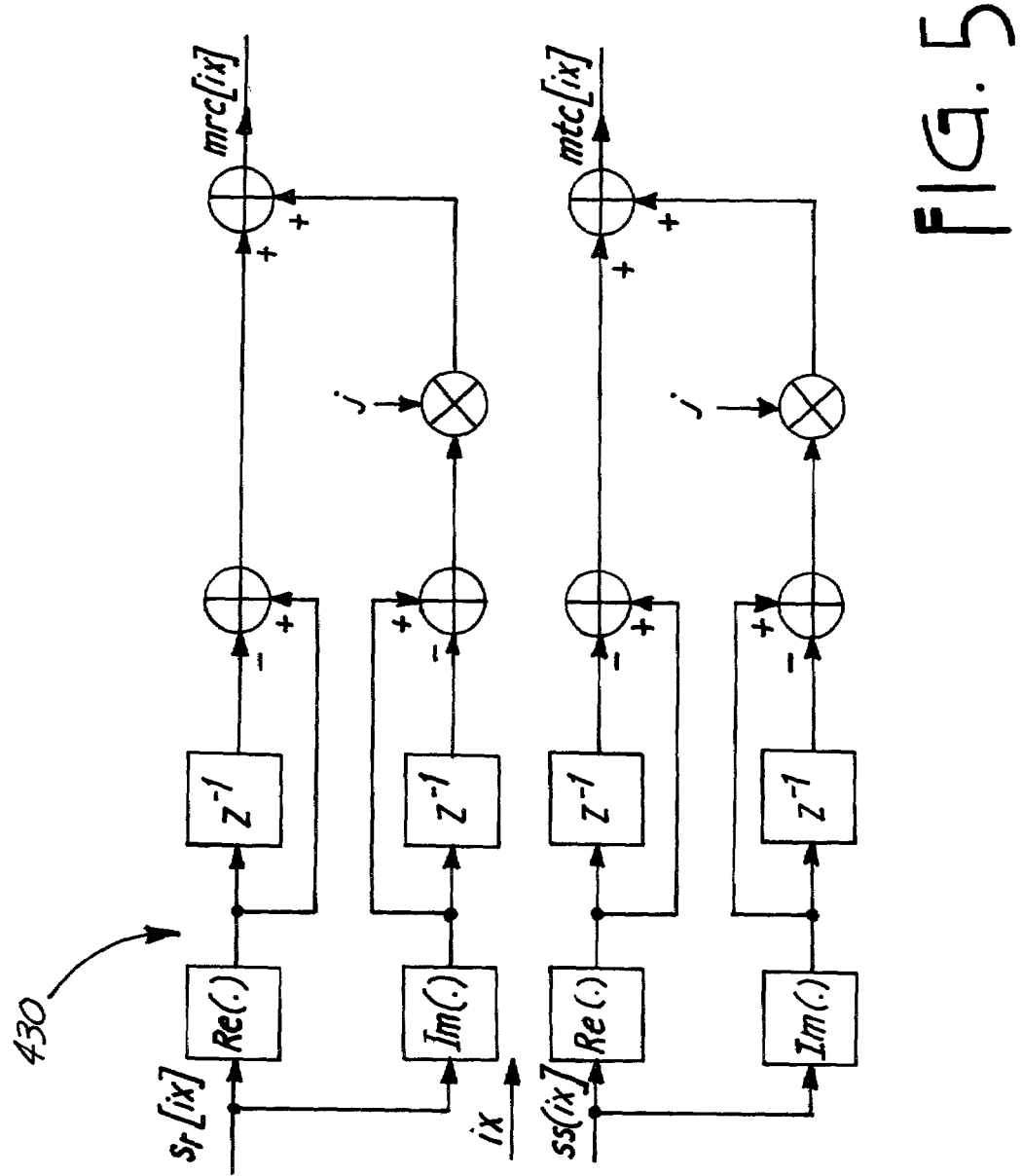
FIG. 5 is a block diagram illustrating one embodiment of circuitry configured to implement the find slope function or circuitry shown in FIG. 4.

Slope identifying circuitry 430 finds the slope of each intersecting curve $s_r[n]$ and ss[n] at the point of intersection (n=ix). Any intersecting point in one phasor revolution is sufficient. This method uses the intersecting point sample $S_r[ix]$ (intersecting point in curve $S_r[n]$) and SS[ix−1] (intersecting point in curve SS[n]) and the previous sample in the approximation of the slope, but linear interpolation could be used to find two points on either side of the intersecting point on the respective curves. This latter method could be used to give a more accurate slope value at the point of intersection between the curves and to possibly reduce the required sampling rate. The complex outputs mrc[ix] 432 and mtc[ix] 433 of slope identifying function 430 can be determined using the relationships of Equations 13 and 14, which are modeled in FIG. 5.

$$mrc_{ix} = Re(s_{r_{ix}}) - Re(s_{r_{ix-1}}) + j \cdot (Im(s_{r_{ix}}) - Im(s_{r_{ix-1}})) \quad \text{Equation 13}$$

where, $Sr_{ix} = S_r[n]$ for n=ix (point of intersection) and;
$Sr_{ix-1} = S_r[n]$ for n=ix−1 (previous sample).

$$mt_{ix} = Re(ss_{ix}) - Re(ss_{ix-1}) + j \cdot (Im(ss_{ix}) - Im(ss_{ix-1})) \quad \text{Equation 14}$$

where, $SS_{ix} = SS[n]$ for n=ix; and
$SS_{ix-1} = SS[n]$ for n=ix−1 (previous sample).

Figure 6:
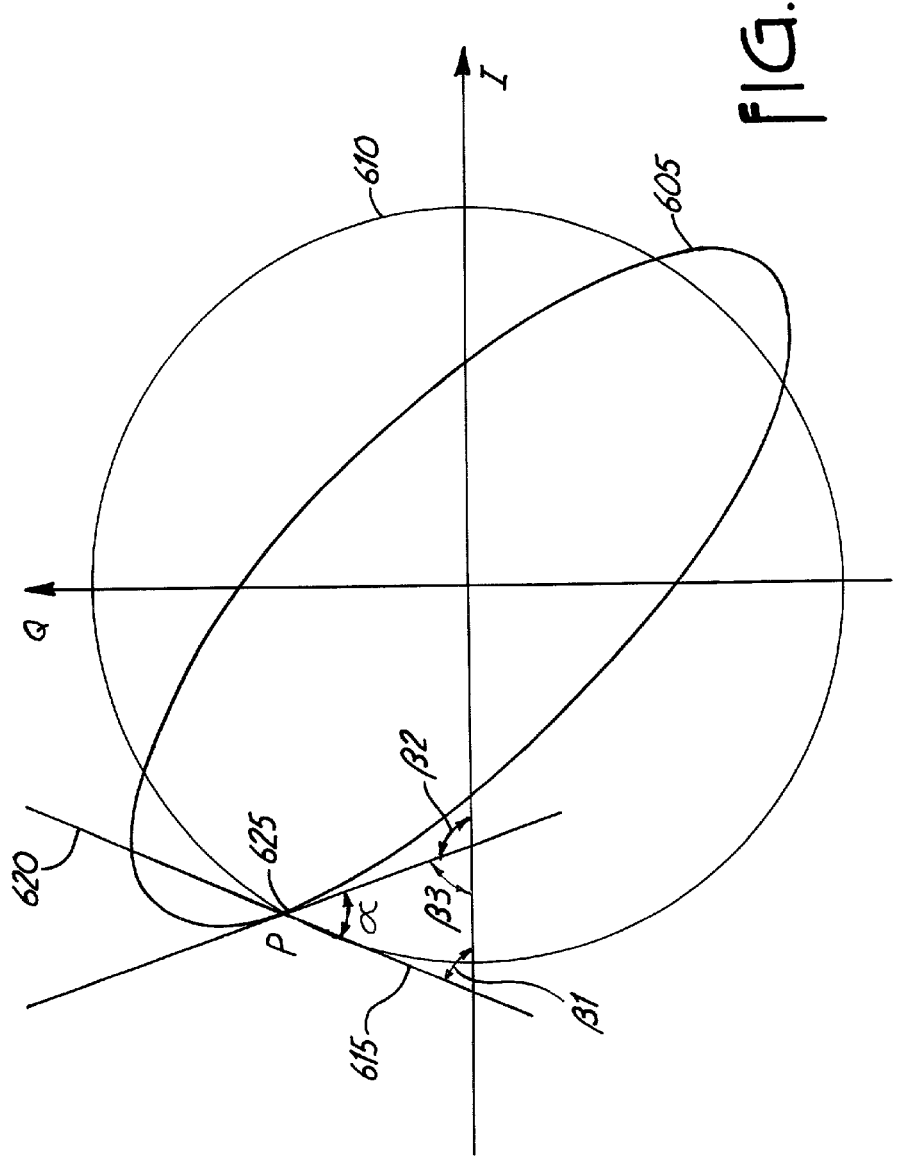
FIG. 6 is a diagrammatic plot illustrating the distortion caused by the phase error which makes the transmitter signal elliptical and which can be used to determine phase error using the angle of intersection methods of the present invention.

The phase error of the transmitter expresses itself in the angle of intersection of the desired and actual transmitter envelopes $Env_t[n]$ and $Env_r[n]$, respectively. As shown in FIG. 6, the distortion caused by the phase error makes the transmitter signal elliptical with a 45 degree tilt (see ellipse 605). The angle of intersection, α between the transmitter signal (represented by 605) and the desired transmitter signal (represented by 610) can be computed from any point of intersection of the two curves as derived from plane geometry discussed below. The sum of all the angles of triangle 615 formed by angles α, β1 and β3 is 180 degrees. Angle β3 is equal to 180-β2, and the angle of intersection, α, is therefore equal to β2-β1.

It can be shown that:

$$\tan(\alpha) = \tan(\beta 1 - \beta 1) = (\tan(\beta 2) - \tan(\beta 1)) \cdot (1 + \tan(\beta 2) \cdot \tan(\beta 1))^{-1} \quad \text{Equation 15}$$

Now, the tangent value effectively gives the slope of the line 620 through the point of intersection 625, and we will let mr represent tan(β2) & mt represent tan(β1) giving:

$$\alpha_{d_k} = \left[\tan^{-1}\left(\frac{mr - mt}{1 + mr \cdot mt}\right)\right] \cdot INV \quad \text{Equation 16}$$

Where INV is discussed below and where the slopes are formed as shown in Equations 17 and 18 (division by zero must be avoided).

$$mt_k = Im(mtc_{ix}) \cdot (Re(mtc_{ix}))^{-1} \quad \text{Equation 17}$$

$$mr_k = Im(mrc_{ix}) \cdot (Re(mrc_{ix}))^{-1} \quad \text{Equation 18}$$

Therefore, assuming that the angle of intersection α of the two waveforms approximates the transmitter phase error, then the slope of the intersections can be computed using the above equation thus giving a method of estimating the phase error. The INV factor in the Equation 16 is needed because there is a phase ambiguity depending upon which intersection point is used. If the magnitude of the imaginary coordinate of the point of intersection 625 is greater than the magnitude of the real part, INV=−1, otherwise it is 1.

Figure 7:
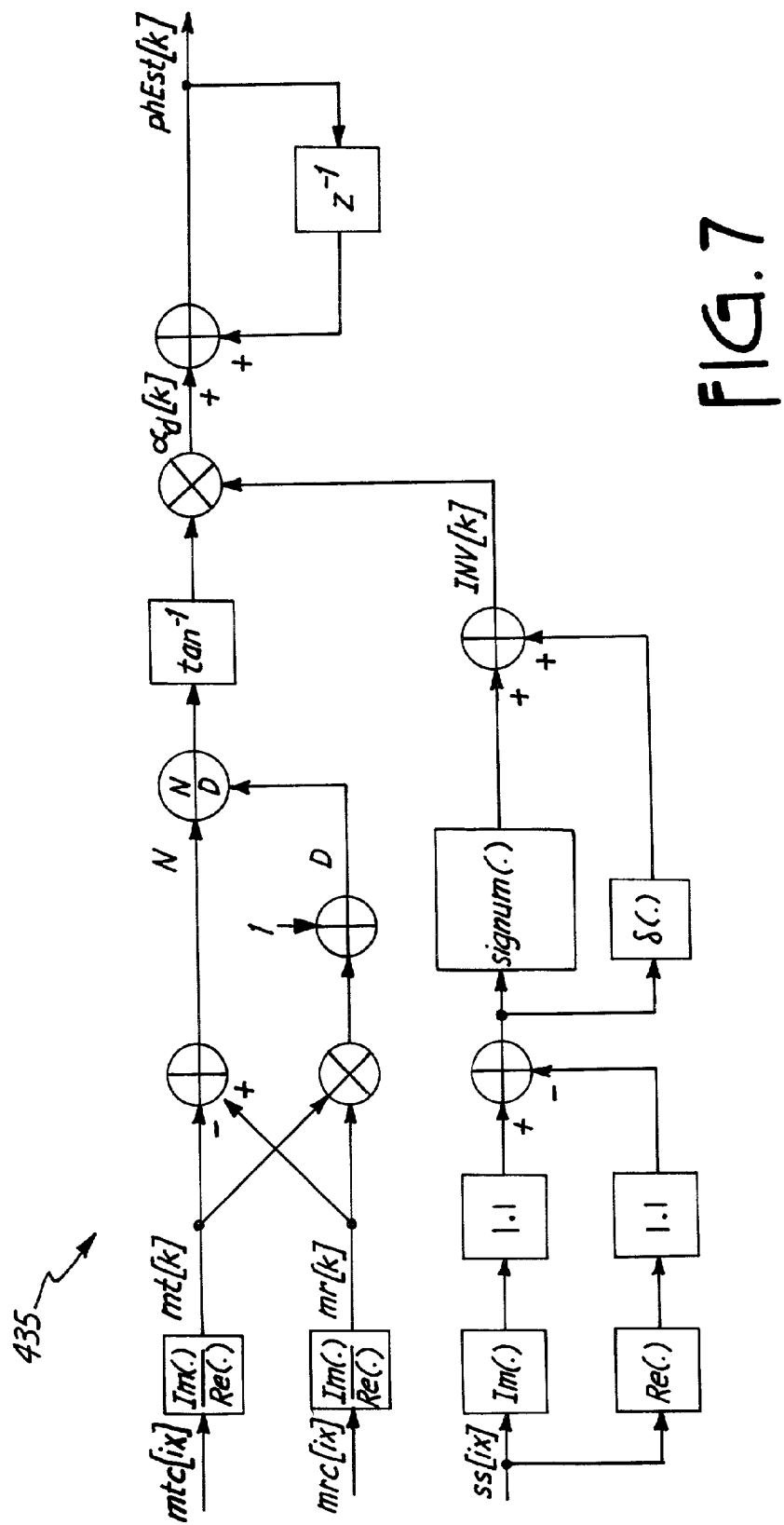
FIG. 7 is a block diagram illustrating one embodiment of circuitry configured to implement the phase gain computation function or circuitry shown in FIG. 4.

A circuit 435 for implementing the mathematics described above is shown in FIGS. 4 and 7. Since the signum function outputs a −1 for a negative input, 0 for a 0 input, and 1 for a positive input, the impulse function is included to make 0 inputs positive. Each update of $\alpha_d$ is integrated with the previous phase error estimate, thus forming a new one. The phase estimate phEst[k] 181 computed in this way converges on the actual phase error to within 0.1 degrees. The phase estimate phEst[k] so computed will be filtered (not shown) to provide noise immunity.

Referring back to FIG. 4, find max and min function or circuitry 440 is included in circuitry 180, receiving as an input transmitter envelope Env$_r$[n]. Circuitry 440 finds the variation in the transmitter envelope for use in approximating the gain error in the error transmitter 130. It compares the filtered envelope with a maximum and a minimum value to effectively compute the semi-major and semi-minor axes (Ex[k] 441 and En[k] 442 respectively) of the elliptical transmitter waveform. In computing Ex, the unit step function is 1 for a 0 or positive input (that is, when Env$_r$[n]≧Ex[k]) which selects the nth value of the envelope to replace Ex[k]. There is no change in Ex[k] when Env$_r$[n]<Ex[k].

Calibration circuitry 180 also includes gain estimate computation circuitry 445. Circuitry 445 receives as inputs from circuitry 440 the semi-major and semi-minor axes Ex[k] 441 and En[k] 442. Circuit 445 integrates the envelope variation with the old gain estimate after the phase is toggled for each iteration. The phase inversion which may be replaced by a 1-pole averager is represented as EvenOdd which alternately inverts the sign of the envelope variation and is needed to maintain stability in the gain estimates because the phase estimate can be occurring simultaneously and the two estimates interact. The gain estimate GnEst[k] 182 provided by circuitry 445 can converge to within 0.01 db of the actual gain G. It can be filtered (not shown) to provide noise immunity similar to the handling of the Phase Estimate mentioned above. The output is given by Equation 19:

$$GnEst_k = GnEs_{k-1} + EvenOdd \cdot (Ex_k - En_k) \qquad \text{Equation 19}$$

Also included in calibration circuitry 180 are centroid computation circuitry 450 and dc estimate generating circuitry 455. Circuitry 450 implements a mathematical model for computing the centroid of the filtered transmitter envelope. The components of the Calculus of the centroid of a curve include the length, L, of the curve and the moments of each element of L with respect to each of two aces (I and Q in this case). The moment of each element of the waveform is computed for both the in-phase and quadrature components of the envelope. The length L, of the path traced out by the received and filtered, transmitter envelope phasor, s$_r$ (406), is also computed. L is used in the next two computations of the centroid of the phasor path, idc and qdc. Other methods of effectively computing the centroid by using the envelope error, Env$_e$, may be possible. The resulting updates are then integrated by the dc estimate computation circuitry 455 with the previous dc offset estimates for use during the next epoch or decimation period. The envelope notation used here, s$_r$ (406), results from the quadrature resolution of Efr[n] 171. The number of samples in a rotation of the envelope phasor is $0.5 * n_x$ where $n_x$ is the total number of samples generated for study (two rotations, or 4*pi, worth of samples). The last half (thus the 0.5 factor on $n_x$ below) are used to avoid transient effects in the data.

The waveform path length L is then given by Equation 20:

$$L_k = \sum_{b=0.5 \cdot n_x}^{n_x - 1} \sqrt{(\text{Im}(s_{r_b}) - \text{Im}(s_{r_{b-1}}))^2 + (\text{Re}(s_{r_b}) - \text{Re}(s_{r_{b-1}}))^2} \qquad \text{Equation 20}$$

where $n_x$ is defined above and s$_r$[b] and s$_r$[b−1] (406) are adjacent samples of the quadrature resolution of Efr (171).

The quadrature components of the centroid of the received and filtered envelope waveform can then be computed as shown in Equations 21 and 22 which effectively satisfy the evaluation of the well known, however more recognizable, equations for the centrod of a curve in an x-y plane ($x_c = \int x * ds$ and $y_c = \int y * ds$) in discrete form:

$$idc_k = \left[ \sum_{b=0.5 \cdot n_x}^{n_x - 1} (\text{Re}(s_{r_b}) + \text{Re}(s_{r_{b-1}})) \cdot 0.5 \cdot \sqrt{(\text{Im}(s_{r_b}) - \text{Im}(s_{r_{b-1}}))^2 + (\text{Re}(s_{r_b}) - \text{Re}(s_{r_{b-1}}))^2} \right] \cdot (L_k)^{-1} \qquad \text{Equation 21}$$

$$qdc_k = \left[ \sum_{b=0.5 \cdot n_x}^{n_x - 1} (\text{Im}(s_{r_b}) + \text{Im}(s_{r_{b-1}})) \cdot 0.5 \cdot \sqrt{(\text{Im}(s_{r_b}) - \text{Im}(s_{r_{b-1}}))^2 + (\text{Re}(s_{r_b}) - \text{Re}(s_{r_{b-1}}))^2} \right] \cdot (L_k)^{-1} \qquad \text{Equation 22}$$

The centroid coordinates are integrated with the appropriate previous dc error estimates. The dc estimates also will be filtered (not shown) to provide noise immunity similar to the handling of the phase and gain estimates mentioned above. The outputs 183 and 184 can be given by Equations 23 and 24:

$$idc_{est_k} = idc_{est_{k-1}} + idc_k \qquad \text{Equation 23}$$

$$qdc_{est_k} = qdc_{est_{k-1}} + qdc_k \qquad \text{Equation 24}$$

The invention has been described as generating a phase error estimate, a gain error estimate, and a dc offset estimate. Said estimates may be generated simultaneously or in any order. Furthermore, any combination of said estimates may be performed as desired.

Although the present invention has been described with reference to illustrative embodiments, workers skilled in the art will recognize that changes may be made in form and detail without departing from the spirit and scope of the invention.

What is claimed is:

1. A quadrature modulator compensation system for compensating the transmission of a source signal provided by a signal source data generator, the quadrature modulator compensation system comprising:
   a transmitter which translates a baseband transmitter input signal to a local oscillator frequency to generate a transmitter output signal;
   calibration circuitry coupled to the transmitter suitable for sequentially generating at least two of a phase error estimate, a gain error estimate, and a dc offset estimate; and predistortion circuitry coupled to the signal source, the transmitter and the calibration circuitry, the predistortion circuitry receiving the source signal and the phase error estimate of the transmitter as inputs and providing as an output the transmitter input signal as a function of the phase error estimate of the transmitter.

2. The quadrature modulator compensation system of claim 1, wherein the calibration circuitry is configured to generate the phase error estimate of the transmitter as a function of an angle of intersection between a desired transmitter envelope and an actual transmitter envelope and the gain error estimate of the transmitter as a function of variation in the actual transmitter envelope, and wherein the predistortion circuitry provides the transmitter input signal also as a function of the gain error estimate of the transmitter generated by the calibration circuitry.

3. The quadrature modulator compensation system of claim 2, wherein the calibration circuitry is configured to determine semi-major and semi-minor axes of an elliptical transmitter waveform, and to generate the gain error estimate of the transmitter as a function of the determined semi-major and semi-minor axes.

4. The quadrature modulator compensation system of claim 3, wherein the calibration circuitry is configured to determine a centroid of the actual transmitter envelope.

5. The quadrature modulator compensation system of claim 4, wherein the calibration circuitry is configured to generate the dc offset estimate in an in-phase component and a quadrature component of the source signal as a function of the centroid of the actual transmitter envelope.

6. The quadrature modulator compensation system of claim 5, wherein the predistortion circuitry is configured to provide the transmitter input as a function of the dc offset estimate in the in-phase and quadrature components of the source signal.

7. The quadrature modulator compensation system of claim 1, wherein the calibration circuitry is configured to determine a centroid of the actual transmitter envelope.

8. The quadrature modulator compensation system of claim 7, wherein the calibration circuitry is configured to generate the dc offset estimate in an in-phase component and a quadrature component of the source signal as a function of the centroid of the actual transmitter envelope.

9. The quadrature modulator compensation system of claim 8, wherein the predistortion circuitry is configured to provide the transmitter input as a function of the dc offset estimate in the in-phase and quadrature components of the source signal.

10. A method of compensating transmission of a source signal in a quadrature modulator, the method comprising:
calculating an actual transmitter envelope;
calculating a desired transmitter envelope;
determining a phase error estimate of the transmitter as a function of an angle of intersection between the desired transmitter envelope and the actual transmitter envelope;
predistorting the source signal to generate a transmitter input signal, wherein the transmitter input signal is generated as a function of the source signal and the determined phase error estimate;
generating a gain error estimate of the transmitter, estimating a dc offset; and
generating a transmitter output signal as a function of the transmitter input signal,
wherein at least two of the phase error estimate, the gain error estimate, and the dc offset estimate are sequentially generated.

11. The method of claim 10, and further comprising:
calculating a variation in the actual transmitter envelope;
generating the gain error estimate of the transmitter as a function of the variation in the actual transmitter envelope; and
generating the transmitter input signal also as a function of the gain error estimate of the transmitter.

12. The method of claim 11, wherein calculating the variation in the actual transmitter envelope and generating the gain error estimate of the transmitter further comprise:
determining semi-major and semi-minor axes lengths of an elliptical transmitter waveform; and
determining the gain error estimate as a function of the determined semi-major and semi-minor axes lengths.

13. The method of claim 10, and further comprising:
determining a centroid of the actual transmitter envelope; and
estimating the dc offset in an in-phase component and a quadrature component of the source signal as a function of the centroid of the actual transmitter envelope.

14. The method of claim 13, wherein predistorting the source signal to generate the transmitter input signal further comprises generating the transmitter input signal also as a function of the estimated dc offset in the in-phase and quadrature components of the source signal.

15. A quadrature modulator compensation system for compensating the transmission of a source signal provided by a signal source data generator, the quadrature modulator compensation system comprising:
a transmitter which translates a baseband transmitter input signal to a local oscillator frequency to generate a transmitter output signal;
calibration circuitry coupled to the transmitter and configured to generate at least one of:
a phase error estimate of the transmitter as a function of an angle of intersection between a desired transmitter envelope and an actual transmitter envelope,
a gain error estimate of the transmitter as a function of variation in the actual transmitter envelope, and
a dc offset estimate in an in-phase component and a quadrature component of the source signal as a function of a centroid of the actual transmitter envelope;
and
predistortion circuitry coupled to the signal source, the transmitter and the calibration circuitry, the predistortion circuitry receiving the source signal and at least one of the phase error estimate, the gain error estimate, and the dc offset estimate as inputs and providing as an output the transmitter input signal as a function of at least one of the phase error estimate, the gain error estimate, and the dc offset estimate,
wherein the calibration circuitry sequentially generates at least two of the phase error estimate, the gain error estimate, and the dc offset estimate.

16. The quadrature modulator compensation system of claim 15, wherein the centroid of the actual transmitter envelope is determined by the calibration circuitry.

17. The quadrature modulator compensation system of claim 16, wherein the predistortion circuitry is configured to provide the transmitter input as a function of the estimated dc offset in the in-phase and quadrature components of the source signal.

18. The quadrature modulator compensation system of claim 15, wherein the calibration circuitry is configured to determine semi-major and semi-minor axes of an elliptical transmitter waveform, and to generate the gain error estimate of the transmitter as a function of the determined semi-major and semi-minor axes.

19. The quadrature modulator compensation system of claim 15, wherein the calibration circuitry simultaneously generates at least two of the phase error estimate, the gain error estimate, and the dc offset estimate.

* * * * *